United States Patent
Clement

(10) Patent No.: US 9,893,769 B2
(45) Date of Patent: Feb. 13, 2018

(54) COMPUTER ECOSYSTEM WITH TEMPORARY DIGITAL RIGHTS MANAGEMENT (DRM) TRANSFER

(71) Applicant: SONY CORPORATION, Tokyo (JP)

(72) Inventor: Jason Clement, San Diego, CA (US)

(73) Assignee: SONY CORPORATION, Tokyo (JP)

( * ) Notice: Subject to any disclaimer, the term of this patent is extended or adjusted under 35 U.S.C. 154(b) by 1049 days.

(21) Appl. No.: 14/095,309

(22) Filed: Dec. 3, 2013

(65) Prior Publication Data

US 2015/0154386 A1  Jun. 4, 2015

(51) Int. Cl.
*G06F 21/10* (2013.01)
*H04B 5/00* (2006.01)
*H04N 21/4627* (2011.01)
*H04N 21/254* (2011.01)

(52) U.S. Cl.
CPC .......... *H04B 5/0056* (2013.01); *G06F 21/10* (2013.01); *H04B 5/0031* (2013.01); *H04N 21/2541* (2013.01); *H04N 21/4627* (2013.01); *G06F 2221/0779* (2013.01); *G06F 2221/2137* (2013.01)

(58) Field of Classification Search
CPC ............ H04N 21/2541; H04N 21/4627; H04L 9/3215; H04L 63/045; H04L 63/06; G06F 21/10; H04B 5/0031; H04B 5/0056
USPC ........................................................ 705/59
See application file for complete search history.

(56) References Cited

U.S. PATENT DOCUMENTS

| | | | |
|---|---|---|---|
| 7,318,236 B2 | 1/2008 | Demello et al. | |
| 7,487,128 B2* | 2/2009 | Spagna | G06F 21/10 705/51 |
| 7,577,999 B2 | 8/2009 | Narin et al. | |
| 7,620,809 B2* | 11/2009 | Prologo | H04L 63/0823 380/43 |
| 7,770,229 B2 | 8/2010 | Upendran | |
| 7,840,489 B2 | 11/2010 | Candelore | |
| 7,962,953 B2 | 6/2011 | Chandra et al. | |
| 8,005,419 B2 | 8/2011 | Patsiokas et al. | |
| 8,166,300 B2 | 4/2012 | Björkengren et al. | |
| 8,214,912 B2 | 7/2012 | Lee et al. | |
| 8,271,390 B2 | 9/2012 | Koppen et al. | |
| 8,321,673 B2 | 11/2012 | Lee | |
| 8,502,480 B1* | 8/2013 | Gerszberg | H05B 37/02 315/312 |
| 8,521,131 B1* | 8/2013 | Ramalingam | G06Q 20/10 455/410 |
| 8,626,867 B2* | 1/2014 | Boudreau | H04W 4/08 455/414.1 |
| 8,726,403 B2* | 5/2014 | Huang | H04L 9/083 380/201 |
| 8,806,530 B1* | 8/2014 | Izdepski | H04N 21/258 725/141 |

(Continued)

OTHER PUBLICATIONS

Mark A. Myers, "Metered Content", http://ip.com/IPCOM/000171438, Jun. 9, 2008.

(Continued)

*Primary Examiner* — John W Hayes
*Assistant Examiner* — Edgar R Martinez-Hernandez
(74) *Attorney, Agent, or Firm* — John L. Rogitz

(57) ABSTRACT

A user who purchases content can temporarily transfer rights to play the content to another device, provided the device registered to have the rights in nearby.

22 Claims, 3 Drawing Sheets

(56) References Cited

U.S. PATENT DOCUMENTS

| | | | |
|---|---|---|---|
| 9,094,730 B1* | 7/2015 | Kirmse | H04N 21/4826 |
| 9,268,922 B2* | 2/2016 | Durbha | G06F 21/10 |
| 2003/0028622 A1* | 2/2003 | Inoue | G06F 21/6218 |
| | | | 709/219 |
| 2005/0060542 A1* | 3/2005 | Risan | G06F 21/10 |
| | | | 713/165 |
| 2005/0132209 A1* | 6/2005 | Hug | G06F 21/10 |
| | | | 713/189 |
| 2005/0144019 A1* | 6/2005 | Murakami | G06F 21/10 |
| | | | 705/59 |
| 2006/0046709 A1* | 3/2006 | Krumm | H04N 21/4126 |
| | | | 455/422.1 |
| 2006/0123484 A1* | 6/2006 | Babic | G06F 21/10 |
| | | | 726/26 |
| 2006/0282394 A1* | 12/2006 | Jothipragasam | G06F 21/10 |
| | | | 705/59 |
| 2007/0192276 A1 | 8/2007 | Lee et al. | |
| 2007/0202887 A1* | 8/2007 | Counts | G01S 5/0252 |
| | | | 455/456.1 |
| 2007/0219917 A1 | 9/2007 | Liu et al. | |
| 2008/0005034 A1* | 1/2008 | Kravitz | G06F 21/10 |
| | | | 705/59 |
| 2008/0066181 A1* | 3/2008 | Haveson | H04N 21/4788 |
| | | | 726/26 |
| 2008/0120242 A1* | 5/2008 | Krig | G06F 21/10 |
| | | | 705/59 |
| 2008/0148363 A1* | 6/2008 | Gilder | G06F 21/10 |
| | | | 726/4 |
| 2009/0106847 A1* | 4/2009 | Krupman | G06F 21/10 |
| | | | 726/26 |
| 2009/0313471 A1 | 12/2009 | Björkengren et al. | |
| 2011/0113122 A1* | 5/2011 | Drope | G06F 17/30017 |
| | | | 709/219 |
| 2011/0131520 A1* | 6/2011 | Al-Shaykh | H04L 12/2807 |
| | | | 715/772 |
| 2011/0239279 A1 | 9/2011 | Chandra et al. | |
| 2011/0239280 A1 | 9/2011 | Chandra et al. | |
| 2011/0320819 A1* | 12/2011 | Weber | H04L 9/3215 |
| | | | 713/176 |
| 2012/0079129 A1* | 3/2012 | Rensin | H04N 21/2187 |
| | | | 709/231 |
| 2012/0131606 A1 | 5/2012 | Lejeune et al. | |
| 2012/0136749 A1 | 5/2012 | Hu et al. | |
| 2012/0291140 A1 | 11/2012 | Robert et al. | |
| 2013/0165040 A1* | 6/2013 | McIntyre | H04L 63/0492 |
| | | | 455/41.1 |
| 2014/0041043 A1* | 2/2014 | Ha | H04N 21/4627 |
| | | | 726/27 |
| 2014/0052872 A1* | 2/2014 | Varoglu | H04L 65/4084 |
| | | | 709/231 |
| 2014/0105561 A1* | 4/2014 | Chen | H04N 21/647 |
| | | | 386/200 |

OTHER PUBLICATIONS

Disclosed Anonymously, "Method for Social Lending of Digital Media via DRM", http://ip/com/IPCOM/000202536, Dec. 21, 2010.

* cited by examiner

COMPUTER ECOSYSTEM WITH TEMPORARY DIGITAL RIGHTS MANAGEMENT (DRM) TRANSFER

FIELD OF THE INVENTION

The present application relates generally to computer ecosystems and more particularly to digital rights management (DRM) transfer mechanisms.

BACKGROUND OF THE INVENTION

A computer ecosystem, or digital ecosystem, is an adaptive and distributed socio-technical system that is characterized by its sustainability, self-organization, and scalability. Inspired by environmental ecosystems, which consist of biotic and abiotic components that interact through nutrient cycles and energy flows, complete computer ecosystems consist of hardware, software, and services that in some cases may be provided by one company, such as Sony. The goal of each computer ecosystem is to provide consumers with everything that may be desired, at least in part services and/or software that may be exchanged via the Internet. Moreover, interconnectedness and sharing among elements of an ecosystem, such as applications within a computing cloud, provides consumers with increased capability to organize and access data and presents itself as the future characteristic of efficient integrative ecosystems.

Two general types of computer ecosystems exist: vertical and horizontal computer ecosystems. In the vertical approach, virtually all aspects of the ecosystem are owned and controlled by one company, and are specifically designed to seamlessly interact with one another. Horizontal ecosystems, one the other hand, integrate aspects such as hardware and software that are created by other entities into one unified ecosystem. The horizontal approach allows for greater variety of input from consumers and manufactures, increasing the capacity for novel innovations and adaptations to changing demands.

Present principles are directed to specific aspects of computer ecosystems, specifically, allowing a user who owns entitlements to a piece of content to be temporarily viewable on a device that is otherwise unregistered for the DRM rights in the content.

SUMMARY OF THE INVENTION

Present principles accordingly are directed to sharing DRM protected content with friends and family without having to log their systems into the DRM server or registering their device on a DRM holder's account. An authorized device is allowed to transfer, temporarily, entitlement (such as in the form of DRM credentials) to a foreign device allowing playback of DRM protected content on the foreign device for a temporally bounded period. This enables a new paradigm for sharing content with others while preserving digital rights and the security of the content. The authorized device can first authenticate itself with a DRM server and request, e.g., a VOD (Video On Demand) entitlement for a piece of content residing, for instance, in an Ultra Violet or EST (Electronic Sell-Through) library. The authorized device may identify the request as an agent agreement fulfilling a transaction on behalf of a foreign device that is capable of receiving DRM protected content. The VOD license returned is valid only for a limited period of time and must be consumed in the presence of the authorized device. Accordingly, an authorized device includes at least one computer readable storage medium bearing instructions executable by a processor and at least one processor configured for accessing the computer readable storage medium to execute the instructions to configure the processor for receiving a license to play content on a target device. The license includes a first limitation indicating a time period and a second limitation indicating a presence requirement. Responsive to a command to play the content on the target device, the processor when executing the instructions is configured for determining whether current time falls within the time period, determining whether the authorized device receives presence signals from the target device, and providing the content to the target device only responsive to a determination that the current time falls within the time period and the authorized device receives presence signals from the target device.

In some embodiments the presence signals are near field communication (NFC) signals.

In example implementations the processor when executing the instructions is configured for streaming the content to the target device over a near field communication (NFC) link. If desired, the processor when executing the instructions may be configured for streaming the content to the target device over a non-near field communication link.

In some examples the processor when executing the instructions is configured for presenting on a display of the authorized device a user interface (UI) including a first selector selectable to permit a user to access the content temporarily on the target device. The UI may include a second selector selectable to input an identity of the target device to a network server. Remuneration may be given to a user or account associated with the authorized device responsive to inputting the identity of the target device to the network server. The example non-limiting UI may also include a third selector selectable to decline to enter the target device ID.

In another aspect, a method includes receiving, at a content server, a play signal to play content on a target device, and responsive to at least one presence signal from the authorized device indicating that the authorized device is in the presence of the target device, sending the content to the target device for play thereof on the target device.

In another aspect, a system includes at least one computer readable storage medium bearing instructions executable by a processor which is configured for accessing the computer readable storage medium to execute the instructions to configure the processor for requesting a license from a content source for a target device to play content on behalf of an authorized device. The authorized device is authenticated with the content source, but the target device is not authenticated with the target source. Responsive to receiving the license, the target device is enabled to play the content only during a time period imposed by the content source and only while the target device is in the presence of the authorized device.

The details of the present invention, both as to its structure and operation, can be best understood in reference to the accompanying drawings, in which like reference numerals refer to like parts, and in which:

DETAILED DESCRIPTION OF THE PREFERRED EMBODIMENT

Figure 1:
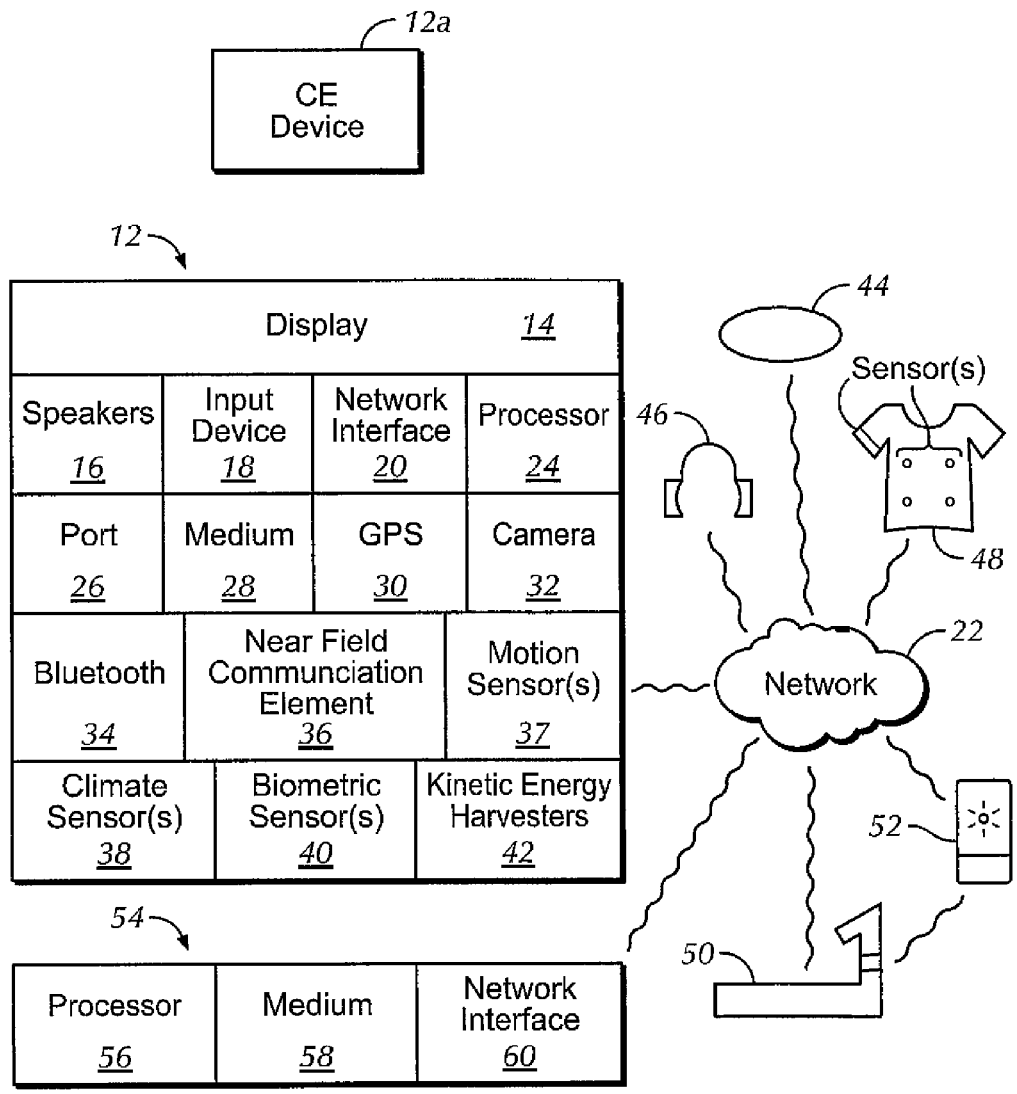
FIG. 1 is a block diagram of an example system including an example in accordance with present principles.

This disclosure relates generally to computer ecosystems including aspects of consumer electronics (CE) device based user information in computer ecosystems. A system herein may include server and client components, connected over a network such that data may be exchanged between the client and server components. The client components may include one or more computing devices including portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a UNIX operating system, or operating systems produced by Apple Computer or Google. These operating environments may be used to execute one or more browsing programs, such as a browser made by Microsoft or Google or Mozilla or other browser program that can access web applications hosted by the Internet servers discussed below.

Servers may include one or more processors executing instructions that configure the servers to receive and transmit data over a network such as the Internet. Or, a client and server can be connected over a local intranet or a virtual private network.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be any conventional general purpose single- or multi-chip processor that can execute logic using structure such as various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires. Such connections may include wireless communication connections including infrared and radio.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is an example consumer electronics (CE) device 12 that may be waterproof (e.g., for use while swimming). The CE device 12 may be, e.g., a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc., and even e.g. a computerized Internet-enabled television (TV). Regardless, it is to be understood that the CE device 12 is configured to undertake present principles (e.g. communicate with other CE devices to undertake present principles, execute the logic described herein, and perform any other functions and/or operations described herein).

Accordingly, to undertake such principles the CE device 12 can be established by some or all of the components shown in FIG. 1. For example, the CE device 12 can include one or more touch-enabled displays 14, one or more speakers 16 for outputting audio in accordance with present principles, and at least one additional input device 18 such as e.g. an audio receiver/microphone for e.g. entering audible commands to the CE device 12 to control the CE device 12. The example CE device 12 may also include one or more network interfaces 20 for communication over at least one network 22 such as the Internet, an WAN, an LAN, etc. under control of one or more processors 24. It is to be understood that the processor 24 controls the CE device 12 to undertake present principles, including the other elements of the CE device 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, Wi-Fi transceiver, etc.

In addition to the foregoing, the CE device 12 may also include one or more input ports 26 such as, e.g., a USB port to physically connect (e.g. using a wired connection) to another CE device and/or a headphone port to connect headphones to the CE device 12 for presentation of audio from the CE device 12 to a user through the headphones. The CE device 12 may further include one or more tangible computer readable storage medium 28 such as disk-based or solid state storage, it being understood that the computer readable storage medium 28 may not be a carrier wave. Also in some embodiments, the CE device 12 can include a position or location receiver such as but not limited to a GPS receiver and/or altimeter 30 that is configured to e.g. receive geographic position information from at least one satellite and provide the information to the processor 24 and/or determine an altitude at which the CE device 12 is disposed in conjunction with the processor 24. However, it is to be understood that that another suitable position receiver other than a GPS receiver and/or altimeter may be used in accordance with present principles to e.g. determine the location of the CE device 12 in e.g. all three dimensions.

Continuing the description of the CE device 12, in some embodiments the CE device 12 may include one or more cameras 32 that may be, e.g., a thermal imaging camera, a digital camera such as a webcam, and/or a camera integrated into the CE device 12 and controllable by the processor 24 to gather pictures/images and/or video in accordance with present principles. Also included on the CE device 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the CE device 12 may include one or more motion sensors 37 (e.g., an accelerometer, gyroscope, cyclometer, magnetic sensor, infrared (IR) motion sensors such as passive IR sensors, an optical sensor, a speed and/or cadence sensor, a gesture sensor (e.g. for sensing gesture command), etc.) providing input to the processor 24. The CE device 12 may include still other sensors such as e.g. one or more climate sensors 38 (e.g. barometers, humidity sensors, wind sensors, light sensors, temperature sensors, etc.) and/or one or more biometric sensors 40 providing input to the processor 24. In addition to the foregoing, it is noted that in some embodiments the CE device 12 may also include a kinetic energy harvester 42 to e.g. charge a battery (not shown) powering the CE device 12.

Still referring to FIG. 1, in addition to the CE device 12, the system 10 may include one or more other CE device types such as, but not limited to, a computerized Internet-enabled bracelet 44, computerized Internet-enabled headphones and/or ear buds 46, computerized Internet-enabled clothing 48, a computerized Internet-enabled exercise machine 50 (e.g. a treadmill, exercise bike, elliptical machine, etc.), etc. Also shown is a computerized Internet-enabled entry kiosk 52 permitting authorized entry to a space. It is to be understood that other CE devices included in the system 10 including those described in this paragraph may respectively include some or all of the various components described above in reference to the CE device 12 such but not limited to e.g. the biometric sensors and motion sensors described above, as well as the position receivers, cameras, input devices, and speakers also described above.

Now in reference to the afore-mentioned at least one server 54, it includes at least one processor 56, at least one tangible computer readable storage medium 58 that may not be a carrier wave such as disk-based or solid state storage, and at least one network interface 60 that, under control of the processor 56, allows for communication with the other CE devices of FIG. 1 over the network 22, and indeed may facilitate communication between servers and client devices in accordance with present principles. Note that the network interface 60 may be, e.g., a wired or wireless modem or router, Wi-Fi transceiver, or other appropriate interface such as, e.g., a wireless telephony transceiver.

Accordingly, in some embodiments the server 54 may be an Internet server, may include and perform "cloud" functions such that the CE devices of the system 10 may access a "cloud" environment via the server 54 in example embodiments.

A second CE device 12a, which may include its own version of some or all of the components described in relation to the CE device 12, may communicate with the CE device 12 using, e.g., the respective near field communication transceivers of the device, for purposes to be shortly exposed.

Figure 2:
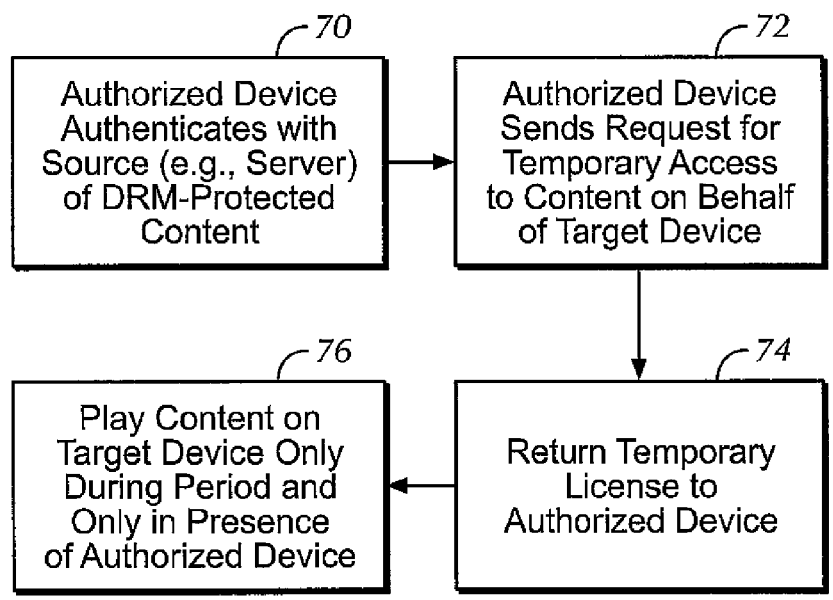
FIG. 2 is a flowchart of example overall logic.

Now referring to FIG. 2, which shows logic that may be implemented by any of the processors above alone or in combination, at block 70 a device such as the CE device 12, typically which has been authorized with digital rights management (DRM) credentials, uses those credentials to authenticate itself with a source of DRM-protected content such as an Internet server 54. Without limitation, the details of authentication may include transferring data via a network interface over the Internet, the data including user name, password, DRM certificates, etc. The authenticating computer, typically the source of content, examines the data against a database of authorized users and if a match is found, grants authentication.

Proceeding to block 72, the authorized device sends to the content source a request for temporary content. This request may include the name of the content, if required DRM credentials of the authorized device/user, and in some implementations an identification of the request as a temporary license request on behalf of another device ("target device") such as the CE device 12a which is not registered or otherwise authorized by the content source to view the DRM-protected content that is the subject of the request. The content, which may be a VOD (Video On Demand), may reside, for instance, in an Ultra Violet or EST (Electronic Sell-Through) library controlled by the content source, e.g., a data structure on the medium 58 of the server 54.

As part of the request at block 72, the identity of the target device may not be required to be sent to the content source. However, in other embodiments the identity of the target device may be required by the content source. The request may also contain information related to the near field transceiver (e.g., element 36 in FIG. 1) of the authorized device for purposes to be shortly disclosed. This information may be, when Bluetooth is used as an example, authorized device name, authorized device class, the list of services of the authorized device, and other information if desired such as device features, device manufacturer, which Bluetooth specification the device uses, the clock offset used by the authorized device.

Then, at block 74 a license is returned to the authorized device that permits, for only a limited time, e.g., one day, the authorized device to transfer the content to the target device for play on the target device at block 76 but only in the limited time period granted by the license and preferably only in the presence of the authorized device as indicated by, e.g., pairing between the two devices using their respective NFC transceivers.

In one example, enforcement of the time period limitation and enforcement of the requirement that the target device can play the content only in the presence of the authorized device is ensured programmatically by the DRM-compliant authorized device. For example, the authorized device, responsive to a command to play the content on the target device, streams the content to the target device but only during a license period specified by the license (with the period being ascertained by, e.g., a secure clock in the authorized device which is accessed by the processor of the authorized device) and only while the authorized device detects that it is paired with the target device over an NFC link, (e.g., as indicated by receiving signals from the target device at the NFC transceiver.) In this example, the content is first received by the authorized device from the content source over, e.g., the Internet using appropriate network interfaces, and then streamed from the authorized device to the target device using any appropriate communication path, including Wi-Fi_33, Bluetooth, wireless telephony, network path, wired or wireless, universal serial bus (USB) path, wired or wireless, and the like.

In another example, the license may constrain the authorized device to stream the content to the target device only during the license period, programmatically enforced by the authorized device as described above, and only using a near field communication path such as Bluetooth or a wired USB connection.

In another example, the content is encrypted by the source using NFC information from the authorized device sent to the source at block 72 of FIG. 2 as described above. In this example, a new key may be required for every content block "N" seconds in length. Each key is based on the NFC information of the authorized device. The authorized device can decrypt the content and then re-encrypt it using a combination of its NFC information and the current time, sending its NFC information to the target device along with the content so that the target device can decrypt and play the content but only contemporaneously with receiving the content over the NFC link from the authorized device.

Figure 3:
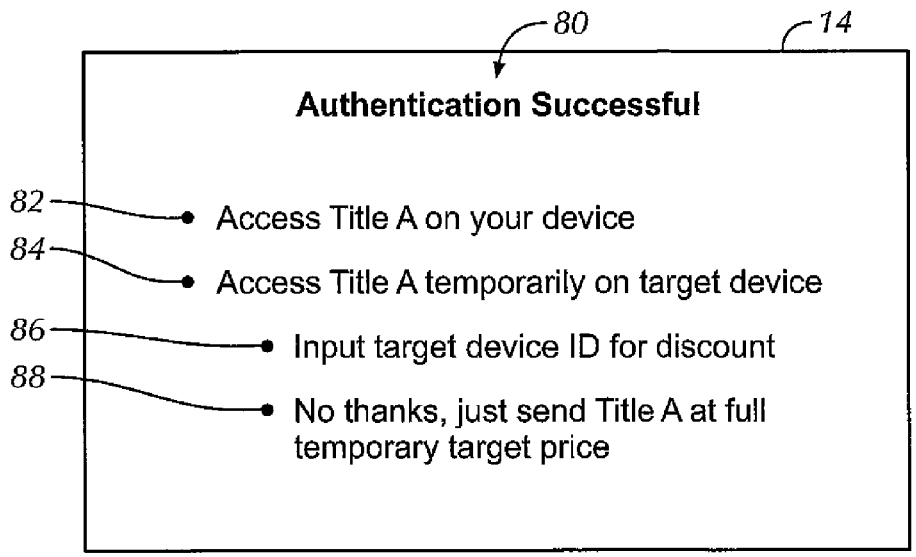
FIGS. 3 and 4 are example user interfaces (UI) that may be used attendant to the present logic.

FIG. 3 illustrates an example user interface (UI) 80 that may be presented on the display 14 of the authorized device (or on the display of the target device in some embodiments) after successful authentication at block 70 in FIG. 2 with the content source. As shown, the UI 80 may inform the user that authentication was successful and offer the user a selector 82 that may be selected by the user (by, e.g., touching a touchscreen 14 or clicking on the selector using a point and click device such as a mouse) to cause a particular content ("Title A" in FIGS. 3 and 4) to be played on the authorized device.

The UI 80 may also offer the user a selector 84 permitting the user to access Title A temporarily on the target device, e.g., 12*a* shown in FIG. 1. The user may be given the option using selector 86 to input a network identity such as a network address of the target device and in some embodiments this may be done in exchange for remuneration, e.g., a discount on the price of the temporary license. The selector 86 if selected may present a drop-down menu of "friend" target devices for easy selection by the user. The list may be obtained from, e.g., a social network site of the user using a browser accessing the Internet to contact the social network site. Or, the user may select 88 to decline to enter the target device ID and pay the full price for the temporary license.

A payment screen (not shown) may then be presented to enable the user to complete the purchase of the temporary license for return thereof at block 74.

Figure 4:
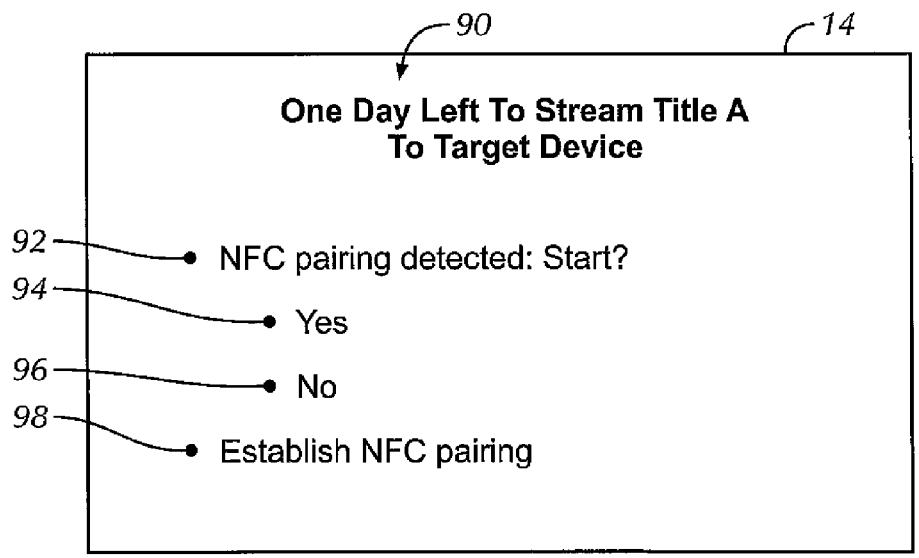

Responsive to the user's authorized device receiving the license, the UI 90 shown in FIG. 4 may be presented on the authorized device, indicating the time period remaining to stream Title A to the target device. If the authorized device processor detects that it is paired with the target device by, e.g., receiving signals including the target device ID over the NFC transceiver of the authorized device, it may so indicate at 92, enabling the user to start streaming by selecting the streaming selector 94. The user may exit out of the UI 90 without streamlining right away by selecting the no selector 96. Or, the user, if message 92 does not indicate that NFC pairing with the target device exists, may select to attempt NFC pairing by selecting the pair selector 98, which causes the processor of the authorized device to attempt to automatically pair with the target device using NFC pairing principles known in the art.

In another implementation, the above principles may be followed except that the content is streamed from the server direct to the target device instead of being streamed from the authorized device to the target device responsive to receiving a play signal from either the target device or the authorized device and further responsive to the authorized periodically sending presence signals to the server assuring the server that the authorized device remains in the presence of the target device as indicated by, e.g., NFC signals from the target device received at an NFC transceiver of the authorized device.

While the particular COMPUTER ECOSYSTEM WITH TEMPORARY DIGITAL RIGHTS MANAGEMENT (DRM) TRANSFER is herein shown and described in detail, it is to be understood that the subject matter which is encompassed by the present invention is limited only by the claims.

What is claimed is:

1. A computer program product (CPP) for an authorized device comprising:
at least one computer readable storage that is not a transitory signal and that comprises instructions executable by at least one processor for:
receiving a license to play content on a target device, the license including a first limitation indicating near field communication (NFC) is to be used to transfer content from the authorized device to the target device;
identifying whether the authorized device receives NFC signals from the target device; and
providing the content to the target device using NFC responsive to identifying that the authorized device receives NFC signals from the target device, wherein content is provided to the target device only while the authorized device detects that it is paired with the target device over an NFC link and only during a license period specified by the license, the license period being ascertained by a secure clock in the authorized device which is accessed by a processor of the authorized device.

2. The CPP for an authorized device of claim 1, wherein the instructions are executable for:
sending NFC information to a source of the content; and
receiving information from the source of the content encrypted using at least some of the NFC information.

3. The CPP for an authorized device of claim 1, wherein the instructions are executable for sending the request for the license to a source of the content with information indicating that the request is for a temporary license for a device other than the authorized device.

4. The CPP for an authorized device of claim 1, wherein the license includes a second limitation indicating a time period, and the instructions are executable for:
identifying whether current time falls within the time period; and
providing the content to the target device using NFC responsive to identifying that the current time falls within the time period and the authorized device receives presence NFC signals from the target device.

5. The CPP for an authorized device of claim 1, wherein the instructions are executable for presenting on a display of the authorized device a user interface (UI) including a first selector selectable to permit a user to access the content temporarily on the target device.

6. The CPP for an authorized device of claim 5, wherein the UI includes a second selector selectable to input an identity of the target device to a network server.

7. The CPP for an authorized device of claim 6, wherein remuneration is given responsive to inputting the identity of the target device to the network server.

8. The CPP for an authorized device of claim 6 wherein the UI includes a third selector selectable to decline to enter the target device ID.

9. Method comprising:
using an authorized device, sending near field communication (NFC) information to a source of content;
receiving information from the source of the content encrypted using at least some of the NFC information;
receiving a signal to play content on a target device, the content being licensed to the authorized device;
responsive to the signal, sending the content to the target device for play thereof on the target device only while the authorized device detects that it is paired with the target device over an NFC link and only during a license period specified by a license.

10. The method of claim 9, comprising:
responsive to the signal and at least one presence signal indicating that the authorized device is in the presence of the target device, sending the content to the target device for play thereof on the target device.

11. The method of claim 9, comprising sending the NFC information to the source of the content with a request for a license indicating that the request is for a temporary license for a device other than the authorized device.

12. The method of claim 9, comprising:
receiving a license to play content on a target device, the license including a first limitation indicating NFC is to be used to transfer content from the authorized device to the target device;
identifying whether the authorized device receives NFC signals from the target device; and
providing the content to the target device using NFC only responsive to identifying that the authorized device receives NFC signals from the target device.

13. The method of claim 9, further comprising:
establishing a time period for playing the content on the target device, the content not being sent to the target device outside the time period, the time period being ascertained by a secure clock in the authorized device which is accessed by a processor of the authorized device.

14. System comprising:
at least one computer memory that is not a transitory signal and that comprises instructions executable by at least one processor for:
requesting a license from a content source for a target device, to play content on behalf of an authorized device, along with information indicating that the license is for a temporary license for a device other than the authorized device, the authorized device being authenticated with the content source, the target device not being authenticated with the content source; and
responsive to receiving the license, enabling the target device to play the content in accordance with the license, wherein content is provided to the target device only while the authorized device detects that it is paired with the target device over an NFC link and only during a license period specified by the license.

15. The system of claim 14, wherein the instructions are executable for:
sending NFC information to the content source; and
receiving information from the content source encrypted using at least some of the NFC information.

16. The system of claim 14, wherein the license includes a first limitation indicating near field communication (NFC) is to be used to transfer content from the authorized device to the target device, and the instructions are executable to:
responsive to a command to play the content on the target device, identifying whether the authorized device receives NFC signals from the target device; and
providing the content to the target device using NFC responsive to identifying that the authorized device receives NFC signals from the target device.

17. The system of claim 14, wherein the instructions are executable for providing the content to the target device only during a time period imposed by the content source and only while the target device is in the presence of the authorized device, the time period being ascertained by a secure clock in the authorized device which is accessed by a processor of the authorized device.

18. The system of claim 14, wherein the instructions are executable for presenting on a display of the authorized device a user interface (UI) including a first selector selectable to permit a user to access the content temporarily on the target device.

19. The system of claim 18, wherein the UI includes a second selector selectable to input an identity of the target device to a network server.

20. The system of claim 19, wherein remuneration is given responsive to inputting the identity of the target device to the network server.

21. The device of claim 1, comprising the at least one processor.

22. The system of claim 14, comprising the at least one processor.

* * * * *